(12) United States Patent
Liebram et al.

(10) Patent No.: US 7,390,993 B2
(45) Date of Patent: Jun. 24, 2008

(54) ELECTRICAL SLEEVE HEATER

(75) Inventors: Udo Liebram, Pfungstadt (DE); Peter Sattler, deceased, late of Zwingenberg (DE); by Anita Sattler, legal representative, Zwingenberg (DE); Hendrik Wölper, Schwelm (DE)

(73) Assignee: Hotset Heizpatronen U. Zubehor GmbH, Ludenscheid (DE)

( * ) Notice: Subject to any disclaimer, the term of this patent is extended or adjusted under 35 U.S.C. 154(b) by 0 days.

(21) Appl. No.: 11/703,604

(22) Filed: Feb. 7, 2007

(65) Prior Publication Data

US 2007/0221659 A1    Sep. 27, 2007

(30) Foreign Application Priority Data

Feb. 8, 2006    (EP) .................................. 06002529

(51) Int. Cl.
*H05B 3/58*    (2006.01)
(52) U.S. Cl. ....................................... 219/535; 219/550

(58) Field of Classification Search ................. 219/535, 219/550
See application file for complete search history.

(56) References Cited

U.S. PATENT DOCUMENTS 5,798,504 A * 8/1998 Schwarzkopf .............. 219/550
5,961,868 A * 10/1999 Schwarzkopf .............. 219/535
7,049,555 B2   5/2006 Sadowski

* cited by examiner

*Primary Examiner*—Tu Ba Hoang
*Assistant Examiner*—Vinod Patel
(74) *Attorney, Agent, or Firm*—Andrew Wilford

(57) ABSTRACT

An electrical sleeve heater for an element having a generally cylindrical outer surface. The heater has a generally helical coil centered on an axis and having a pair of opposite coil ends, a pair of generally coaxial, axially aligned, and similar tubes each fixed to a respective one of the coil ends and surrounding the coil so that relative rotation of the coil can radially increase or decrease an inside diameter of the coil. The tubes having axially adjacent inner ends and outer ends, and means for releasably fixing together the coil inner ends.

12 Claims, 2 Drawing Sheets

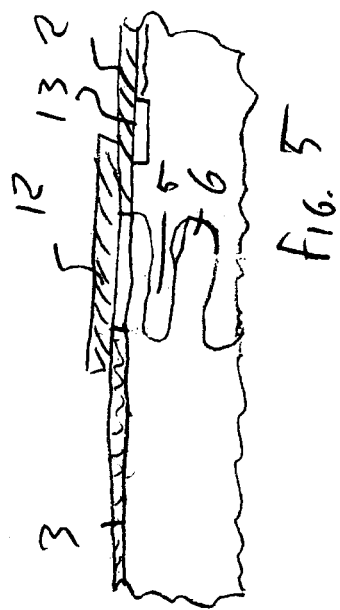
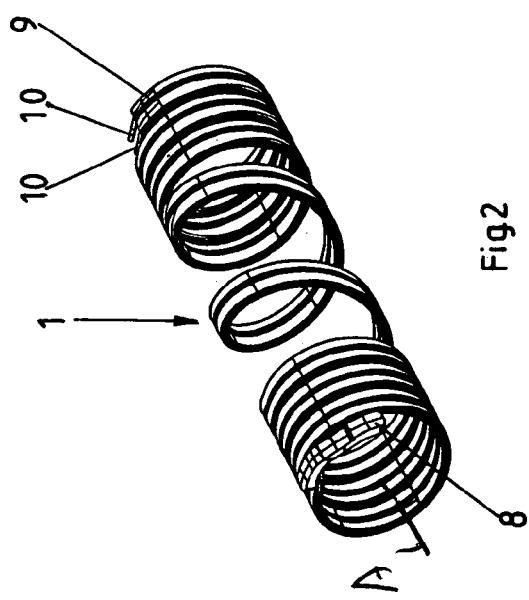
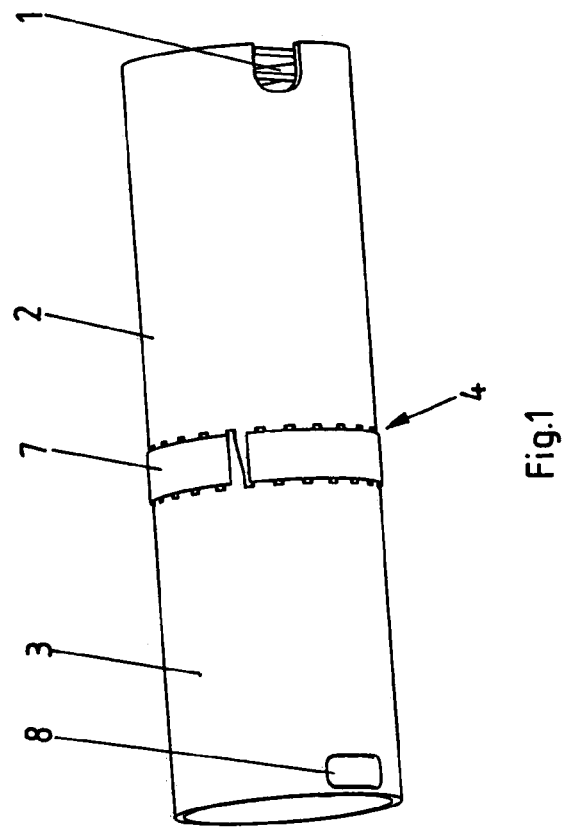

ELECTRICAL SLEEVE HEATER

FIELD OF THE INVENTION

The present invention relates to a sleeve heater. More particularly this invention concerns an electrical sleeve heater used on a feed tube or nozzle of an injection-molding machine.

BACKGROUND OF THE INVENTION

It is standard to heat a machine part, such as an injection-molding nozzle, by fitting it with an electric sleeve heater that is engaged snugly around the part and energized so as to keep the part at a predetermined temperature.

Such a sleeve heater comprises a resistance-type heater coil whose inside diameter is slightly greater than that of the part over which it is to be fitted. Frequently heat-distributing material is provided inside the coil. In order to tighten the coil, it is provided with an external clamping arrangement that urges its inner surface into good heat-transmitting contact with the part to be heated. Such a clamping arrangement can include an outer sleeve provided with a wedge-type screw-operated tightening system that reduces the coil's diameter. Such an arrangement makes the heater fairly bulky so it is difficult to fit in a restricted space, and substantially complicates the installation and use of the sleeve heater. The ends of the coil are attached to the sleeve, further complicating tightening of the coil on the element being heated.

Such heaters may also be installed by externally mounting them on a cylindrical part, for example a nozzle for an injection-molding machine, so that the melt flowing through is heated by the heating cartridge. However, it is also possible to heat a tube around which a melt flows, by inserting the helical electric heating cartridge into the tube and pressing against the tube surface in order to heat the melt or the like externally flowing past the tube.

It is furthermore known to provide a screw-type tangential tightener which is somewhat more compact, but which nonetheless still is difficult to use with closely spaced nozzles. When the part being heated is of an exactly determined size, it is known to slip over the coil an outer sleeve that is dimensioned to compress it to the exact inner diameter desired, and then solder it in place before fitting the coil over the part. This latter arrangement is problematic in that any variation in size makes the heater impossible to install or so loose when installed as to be ineffective.

In another known arrangement described in U.S. Pat. No. 7,049,555 the sleeve heater has an electrical and generally cylindrical heater coil centered on an axis and shaped to fit over a part to be heated, a radially compressible and generally cylindrical inner sleeve snugly coaxially externally surrounding the heater coil, radially inwardly bearing on the coil, and having an axially outwardly projecting tab, and a radially generally inextensible and generally cylindrical outer sleeve fitted coaxially over the inner sleeve and having an inner surface bearing tightly radially inward on the inner sleeve and radially compressing the inner sleeve and the coil inward. Once again, the ends of the coil are fixed to the sleeve so that the coil itself must be radially compressed, which can damage the coil.

OBJECTS OF THE INVENTION

It is therefore an object of the present invention to provide an improved electrical sleeve heater.

Another object is the provision of such an improved electrical sleeve heater that overcomes the above-given disadvantages, in particular that is of simple construction and that is easily tightened on a tube or nozzle.

SUMMARY OF THE INVENTION

An electrical sleeve heater for an element having a generally cylindrical outer surface. The heater has according to the invention a generally helical coil centered on an axis and having a pair of opposite coil ends, a pair of generally coaxial, axially aligned, and similar tubes each fixed to a respective one of the coil ends and surrounding the coil so that relative rotation of the coil can radially increase or decrease an inside diameter of the coil. The tubes having axially adjacent inner ends and outer ends, and means for releasably fixing together the coil inner ends.

Thus with the system of this invention in an installation position the means is ineffective so that the two tubes can be twisted about the axis relative to each other. In this position they may be twisted to radially spread the coil that is then fitted over the element to be heated. Then the two tubes are rotated back in the opposite direction to radially contract the coil, bringing it into tight radial contact with a normally cylindrical outer surface of the element, and the tubes are fixed together in this position.

With this arrangement, therefore, the coil, which because of its composition can be somewhat fragile, is treated fairly gently, with any deformation spread over its entire length. The tightening of this invention is extremely easy to do, uses no complex clamping devices, and is highly effective, while as mentioned above treating the coil very gently.

Alternatively, the arrangement may be provided such that the helical heating cartridge is externally mounted on the tube so that this unit may be inserted into a tubular element to be heated. The helical heating cartridge is first radially contracted to facilitate insertion into the tubular element to be heated. The two tubes can then be twisted with respect to one another, so that the helical heating cartridge is expanded in diameter until the tubes contact the inner surface of the tubular element to be heated, thereby once again achieving good heat transfer. In the desired installation position, i.e. when the helical heating cartridge is pressed against the element to be heated, the two tubes are locked by locking means in the appropriate relative rotational position with respect to one another in a rotationally fixed manner, so that they are unable to independently twist into a position in which the desired position is no longer achieved.

In one preferred refinement, the tubes have teeth on their mutually facing ends and serving as locking means, the teeth being disengaged in the installation position and engaged in the locked position.

According to this design, the tubes may each have axially directed teeth on their mutually facing end faces. To allow the tubes to twist with respect to one another, they are mutually positioned so that the end-face teeth are disengaged and it is possible to twist the tubes relative to one another. As soon as the desired target position is achieved, the end-face teeth of the two tubes are mutually engaged, thereby producing a form-fit connection that prevents the tubes from independently twisting out of this locked position.

The locking means, in particular the teeth, may be covered by a protective layer. Such a protective layer can be an adhesive film, a simple piece of heat-resistant sticky tape.

In addition, the protective layer can be a collar mounted or formed on the end of one of the tubes, the collar covering the locking means or teeth when the tubes are engaged.

It is particularly preferred that the teeth are self-locking. More specifically, the size of the tooth face angle of the end-face teeth is such that when interlocked the teeth are locked, as a result of the coefficient of friction on the tooth flanks. A secure seating of the pair of tubes is thus ensured in the locked position. It may also optionally be provided that the flanks of the teeth are roughened. Thus, if the coefficient of friction, for example, is too small so that self-locking is no longer achieved, the tooth flanks may be chemically roughened, for example, to ensure an increased coefficient of friction which is satisfactory for self-locking.

A temperature sensor may be provided extending parallel to the length of the helical heating cartridge, in a manner known as such. For example, such a temperature sensor may be mounted in the tubular helical heating cartridge.

To achieve a secure rotational drive of the helical heating cartridge during rotation of the tubes, on the end of one of the tubes facing the tube joint an elastic sheet metal tongue or the like is fixed, to which the one end of the helical heating cartridge is attached. The corresponding end of the helical heating cartridge attached to this elastic sheet-metal tongue by hard solder in turn is fixed to the tube by a spot weld. The purpose of the spring, in particular the elastic sheet metal tongue, is to fix the end of the helical heating cartridge to the end region of the tube, the spring furthermore being designed such that in the locked position the helical heating cartridge in this region as well makes a positive fit with the part to be heated in order to ensure optimal heat transfer in this region. For this purpose the spring preferably is designed with a right-angle bend that moves in the direction of the longitudinal center axis of the tubes when the tubes are twisted and the heating coil is correspondingly tightened.

In addition, the end of the helical heating cartridge is fixed to the end of the tube facing away from the tube joint. The electrical connections for the heating cartridge lead out from this end. The other end of the helical heating cartridge is thus fastened to the other tube, likewise in the end region, for example in a direct connection by hard solder. The electrical lines preferably lead out from the helical heating cartridge, so that this region is heated anyway, and therefore it is not necessary to make surface contact with the element to be heated. Fixing both ends of the helical heating cartridge to the two tubes ensures that the helical heating cartridge is rotationally entrained when the tubes are twisted with respect to one another, thus enabling the diameter to be contracted or expanded.

The design according to the invention achieves superior function when used for heating passages of injection-molding devices, uniform, precisely reproducible, and homogeneous heat transfer taking place from the helical electric heating cartridge to the element to be heated. The entire system is also compact, which in certain installation situations is of particular advantage. The device is also composed of only a few components, so that the manufacturing costs are low. For repairs, the device is easily moved from the locked position to the installation position that allows the device to be pulled off or pulled out of the part to be heated.

BRIEF DESCRIPTION OF THE DRAWING

The above and other objects, features, and advantages will become more readily apparent from the following description, reference being made to the accompanying drawing in which:

FIG. 1 is a perspective view of an external heating sleeve according to the invention in the fully installed and operational condition;

FIG. 2 is a perspective view of the heating coil.

FIG. 5 is an axially sectional view of a detail on an alternate system according to the invention.

SPECIFIC DESCRIPTION

As seen in FIGS. 1-4 a device for heating cylindrical parts, in particular nozzles for injection-molding devices comprises a helical electric heating coil 1 that is centered on an axis A and that as shown in FIG. 2 has a center region of greater pitch than its two end regions. For proper use this helical electric heating coil 1 is pushed onto a part to be heated. In the corresponding operating position the heating coil 1 is pressed against the outer surface of the element to be heated. As shown for example in FIG. 1, on its side facing away from the surface to be heated the helical heating coil 1 is enclosed by a tubular housing 2, 3, in particular a reflective tube. The ends of the helical heating coil 1 are fixed to the outer ends of the tube.

Figure 3:
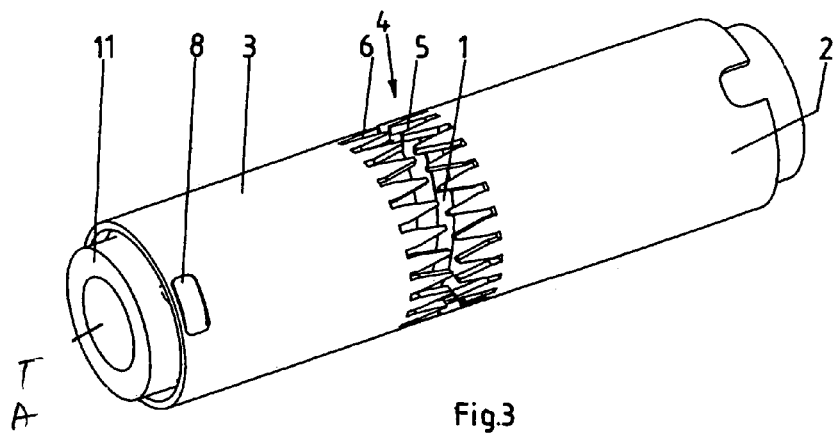
FIG. 3 is a view like FIG. 1 showing the heater in the installation position.
Figure 4:
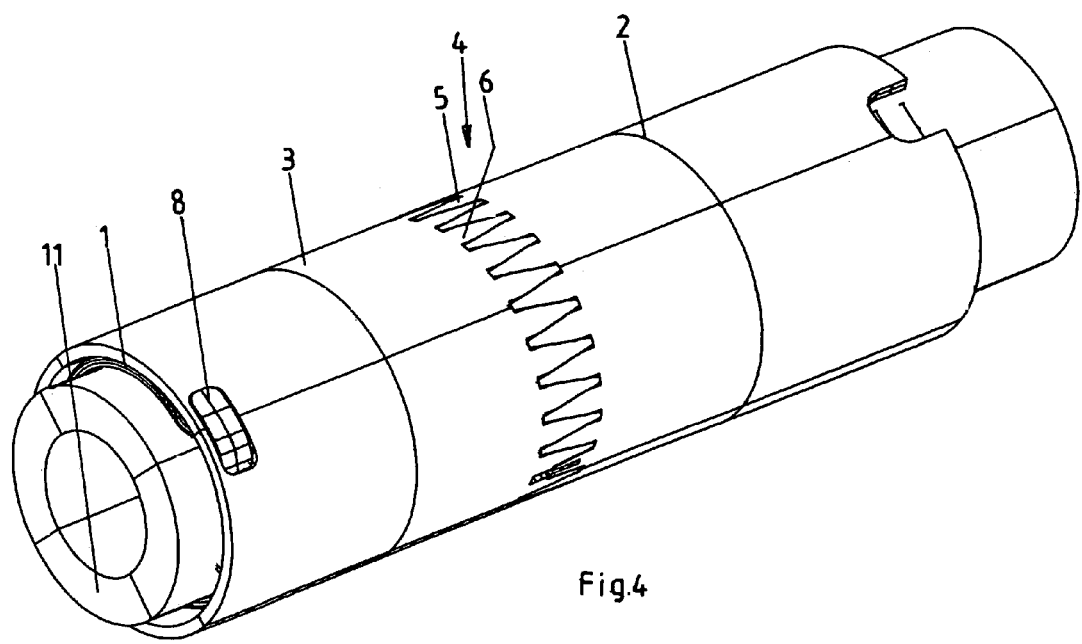
FIG. 4 is a view like FIG. 3 but with the heater tubes fitted together.

To allow the electric heating coil 1 to be tightened against the element to be heated by use of the tube, the tubular housing comprises two tubes 2 and 3 that in an installation position as shown in FIG. 3 may be twisted with respect to one another about the axis A, so that the helical internal heating coil 1 may be contracted in diameter or, by rotating the tubes 2 and 3 in the opposite direction, expanded. The tubes 2 and 3 may be fixed in any given relative rotational position with respect to one another by locking means 4. In the illustrated embodiment the tubes 2 and 3 are provided on their mutually facing inner ends with identical arrays of axially projecting teeth 5 and 6 that are disengaged in the installation position shown in FIG. 3, and in the locking position, shown for example in FIG. 4, are securely engaged.

The locking means 4, in particular the teeth 5 and 6, may be covered by a protective layer 7 which may be provided in the form of an adhesive strip adhered to the outer surface over the teeth 5 and 6.

The teeth 5, 6 preferably are self locking, their flanks roughened to increase the coefficient of friction.

At the end of the first tube 3 facing away from the joint of the tubes 2 and 3 is an elastic sheet metal tongue 8 with a right-angle bend that is also attached to one end of the helical heating coil 1, as shown in FIG. 2. This sheet metal tongue 8 with a right-angle bend is attached to the outer end of the helical heating coil 1 by hard solder. The other end of the elastic sheet metal tongue 8 may be fixed to the outer end of the tube 3 by a spot weld, the tube. 3 in the region of the attachment of the sheet metal tongue 8 having an elongated slot extending circumferentially. The opposite end of the helical heating coil Disassembly may be carried out analogously in the reverse fashion.

FIG. 5 shows how the tube 2 can have an end collar 12 extending outward past the end of its teeth 5 and helping to center and lock the two tubes together in the finished assembly. In addition a heat-sensor 13 is shown that can extend axially inside the tubes 2 and 3.

Of course as mentioned above the system can work oppositely, that is with the tubes 2 and 3 inside the coil 1, for use as an internal heater. In this case the tubes 2 and 3 are rotated for installation to radially contract the coil 1, then oppositely rotated and locked to bring the coil 1 into radial outward engagement with an inner surface of the element being heated.

The invention is not limited to the illustrated embodiment, and may be varied in many ways within the scope of the disclosure.

All novel individual and combined features disclosed in the description and/or drawing are regarded as essential to the invention.

1 may be fixed, for example, at 9 to the end of the second tube 2 facing away from the joint of the tubes 2 and 3, for example by hard solder, electrical connecting lines 10 leading out from this end of the helical heating coil 1.

For proper use, the helical electric heating coil 1 is pushed into the tubes 2 and 3, its two ends 8 and 9 are fixed in the manner described to the ends of the tubes 2 and 3 facing away from one another. The tubes 2 and 3 are then adjusted to a position in which the helical heating coil 1 is expanded radially diameter as far as possible so that it contacts the inner surface of the tubes 2 and 3. In this position the heater as shown in FIG. 1 may be fitted over an element to be heated and correctly positioned. The protective film 7 is then removed. The user may then hold the tube 3 fixed, by hand or using an apparatus, and move the tube 2 axially into an installation position in which the teeth 5 and 6 are disengaged, as shown in FIG. 3. The user may then rotate the tube 2 relative to the tube 3, so that as a result of the rotation the helical heating coil 1 is twisted and contracts radially until it bears inwardly against the outer surface of the element 11 to be heated. The tubes 2 and 3 are then pushed axially toward one another and brought together, resulting in the position according to FIG. 4 in which the teeth 5 and 6 are engaged. This position is locked since the teeth are in a self-locking configuration. The protective film 7 may then be applied once again.

We claim:

1. An electrical sleeve heater for an element having a generally cylindrical outer surface, the heater comprising:
   a generally helical coil centered on an axis and having a pair of opposite coil ends;
   a pair of generally coaxial, axially aligned, and similar tubes each fixed to a respective one of the coil ends and extending axially along the coil, whereby relative rotation of the tubes radially increases or decreases an inside diameter of the coil, the tubes having axially adjacent inner ends; and
   respective identical arrays of axially projecting and interengageable teeth on the tube inner ends for releasably fixing together the tube inner ends, whereby axial interengagement of the teeth of the tube inner ends after relative rotation to change the inside diameter of the coil locks the tubes angularly relative to each other and locks in position the changed inside diameter of the coil.

2. The electrical sleeve heater defined in claim 1 wherein the teeth are axially interfittable in any of a plurality of angularly offset positions of the inner ends.

3. The electrical sleeve heater defined in claim 1 wherein the teeth are substantially all identical and the teeth of the one array fit complementarily with the teeth of the other array.

4. The electrical sleeve heater defined in claim 1 wherein the coil is limitedly elastically deformable for relative axial movement of the tubes for engagement and disengagement of the teeth with each other.

5. The electrical sleeve heater defined in claim 1 wherein the means further includes
   a piece of sticky tape wrapped around and adhered to the tube inner ends when the teeth are interengaged.

6. The electrical sleeve heater defined in claim 1 wherein the teeth are self-locking.

7. The electrical sleeve heater defined in claim 5 wherein the teeth have roughened edges.

8. The electrical sleeve heater defined in claim 1 wherein one of the tubes has an annular collar projecting past the teeth of the one tube and covering the teeth of the other tube in a fitted-together position of the teeth of the tubes.

9. The electrical sleeve heater defined in claim 1 wherein one of the tubes has a spring anchor for the respective end of the coil.

10. The electrical sleeve heater defined in claim 1, further comprising a temperature sensor in one of the sleeves.

11. The electrical sleeve heater defined in claim 1 wherein the coil has a central region of steep pitch and outer ends regions of shallow pitch.

12. The electrical sleeve heater defined in claim 1 wherein the tubes surround the coil.

* * * * *